United States Patent Office 2,705,716
Patented Apr. 5, 1955

2,705,716

POLYHYDROXY ALKYL MERCAPTO MERCURIAL DIURETICS

Lincoln H. Werner and Caesar R. Scholz, Summit, N. J., assignors to Ciba Pharmaceutical Products, Incorporated, Summit, N. J., a corporation of New Jersey No Drawing. Application March 28, 1951,
Serial No. 218,088

6 Claims. (Cl. 260—270)

This invention relates to organic mercurial diuretics. Certain types of organic mercury compounds are known to produce intense diuresis. In general, drugs of this type in current use possess in common the moiety of the structure:

wherein $R^1$ is hydrogen or methyl and $R^2$ is the theophylline or mercaptoacetic acid residue. These drugs leave little to be desired as far as their diuretic effect is concerned but they do give rise to serious side effects. Thus, those containing the theophylline residue have been reported to exhibit an acute cardiac toxicity in some patients [Stanley, Virginia Medical Monthly, vol. 76, page 416 (1949)]. When the organic mercurial is combined with sodium thioglycollate, the acute cardiac toxicity is reduced but it has been reported that renal damage may result (Capps et al., Proc. Soc. Expt'l Biol., vol. 74, page 511).

A primary object of the present invention is the embodiment of a new group of mercurial diuretics which are free from the aforementioned defects and disadvantages of the known compounds of this type. This object is realized, briefly stated, by combining the organic mercurial with a polyhydroxythiol of the structure $$HOCH_2(CHOH)_nCH_2SH$$

wherein $n$ is one of the integers 1, 2, 3, 4 or 5, the resulting products exhibiting superior therapeutic properties with particular reference to cardiac toxicity, chronic renal toxicity, and tissue necrosis at the site of injection.

Suitable polyhydroxy thiols according to the present invention are those containing two or more hydroxy groups, for example the thiols corresponding to glycerol, xylitol, sorbitol, mannitol, etc.

A further object of the invention is the realization of maximum detoxification of the aforementioned organic mercurial diuretics, with particular reference to those which contain the structure:

wherein $R^1$ stands for hydrogen or lower alkyl, such as methyl, ethyl, propyl or butyl, and $n$ has the previously indicated significance. This object is realized according to the present invention, briefly stated, by the provision of a —CONH group adjacent the mercurated side chain and also of a —COOH group, in accordance with the following formula:

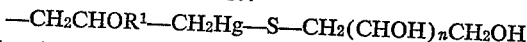

wherein $R^1$ and $n$ have the previously indicated significance, —OC—R—CO— represents the divalent diacyl radical derived from a dicarboxylic acid, and M stands for hydrogen, an alkali metal such as sodium, potassium, lithium or the like, or an alkaline earth metal such as calcium.

The precise character of the —OC—R—CO— group is of secondary importance, so that the R radical may be aliphatic, alicyclic, carbocyclic or heterocyclic in character. Thus, for example, the —OC—R—CO— group may be derived from camphoric acid, N-carboxy succinamic acid, phthalic acid, 2-carboxy-phenoxyacetic acid, quinolinic acid and many others.

The new compounds of the present invention are conveniently produced by reacting a compound having the structure $$HOOC—R—CONH—CH_2CHOR^1—CH_2HgOR^2$$

or its salts, wherein —OC—R—CO— and $R^1$ have the previously indicated significance and $R^2$ is hydrogen or acetyl, with a polyhydroxy thiol, in water or in a dilute aqueous solution of methanol, acetone or the like. The resultant reaction product is then precipitated from the solution by adding further quantities of water-soluble solvents such as acetone, methanol, ethanol, dioxane and the like. The precipitated product is filtered off, washed and dried, whereupon it is obtained as a highly water-soluble powder.

Alternatively, the organic mercurial and the polyhydroxy thiol are mixed in appropriate amounts in water solution, which is then frozen and dried from the frozen state to yield a product which is stable and readily soluble upon mere addition of water.

In the following examples, the invention is illustrated in greater detail with reference to exemplary embodiments thereof. It is to be understood, however, that the examples are presented solely by way of illustration and not by way of limitation. In the examples, parts by weight bear the same relation to parts by volume as do grams to milliliters. Temperatures are expressed in degrees centigrade.

Example 1

17.6 parts by weight of 2-[N-(2-hydroxy-3-hydroxymercuripropyl)-carbamyl]-nicotinic acid, prepared according to Hartmann and Panizzon, U. S. Patent No. 2,136,503, are dissolved in 20 parts by volume of 2- normal sodium hydroxide solution. An equimolecular amount of 1-thiosorbitol dissolved in 20-parts by volume of water is added and the solution filtered. 400 parts by volume of acetone are added to the filtrate and the resultant precipitate is washed with fresh acetone and then dried in vacuo. The resultant product, the 2-[N-2-hydroxy - 3-{D-gluco-pentahydroxyhexyl-mercaptomercuri}-propyl)-carbamyl]-nicotinic acid sodium salt is very soluble in water; it melts at 79° (with decomposition) and corresponds to the formula

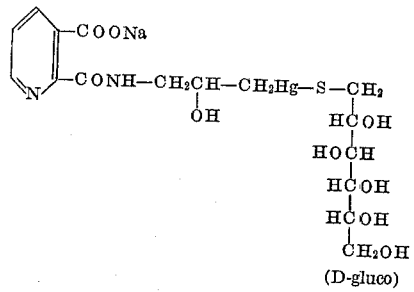

(D-gluco)

Example 2

4.41 parts by weight of 2-[N-(2-hydroxy-3-hydroxymercuripropyl)-carbamyl]-nicotinic acid are dissolved in 10 parts by volume of 1-normal sodium hydroxide solution and then an equimolecular quantity of aqueous thioglycerol is added. After filtering the solution, the reaction product is precipitated from the filtrate by adding 100 parts by volume of acetone. The precipitate is separated by filtration, washed with fresh acetone and dried in vacuo. The obtained product, the 2-[N-(2-hydroxy-3-{2,3 - dihydroxypropylmercaptomercuri}-propyl) - carbamyl]-nicotinic acid sodium salt, is soluble in water. It melts at 74–78° (with decomposition) and corresponds to the formula

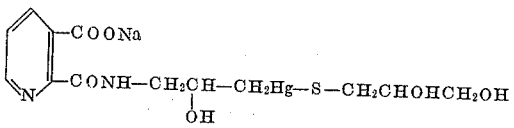

Example 3

4.41 parts by weight of 2-[N-(2-hydroxy-3-hydroxymercuripropyl)-carbamyl]-nicotinic acid are dissolved in 10 parts by volume of 1-normal sodium hydroxide solution and then an equimolecular quantity of 1-thio-xylitol, prepared according to Farlow et al., JACS, vol. 70, page 1392 (1948) is added and the solution filtered. The reaction product is precipitated from the filtrate by adding 100 parts by volume of acetone. The separated precipitate is then washed repeatedly with fresh acetone, whereupon it is dried in vacuo. The product, the 2-[N-(2-hydroxy-3-{D - xylo - tetrahydroxypentyl - mercaptomercuri} - propyl)-carbamyl]-nicotinic acid sodium salt is very soluble in water. It melts at 73° and corresponds to the formula

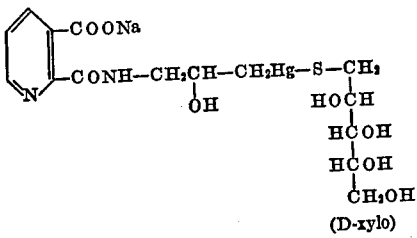

(D-xylo)

Example 4

4.41 parts by weight of 2-[N-(2-hydroxy-3-hydroxymercuripropyl)-carbamyl]-nicotinic acid are dissolved in 10 parts by volume of 1-normal sodium hydroxide solution. Then an equimolecular quantity of 1-thiomannitol, prepared according to Farlow et al. (supra), in 2 parts by volume of water is added and the solution filtered. The product is precipitated from the filtrate by adding 100 parts by volume of acetone. The precipitate is separated, washed repeatedly with fresh acetone and dried in vacuo. The product, the 2-[N-(2-hydroxy-3-{D-manno-pentahydroxyhexyl - mercaptomercuri} - propyl) - carbamyl - nicotinic acid sodium salt, is readily soluble in water. It melts at 64° and corresponds to the formula

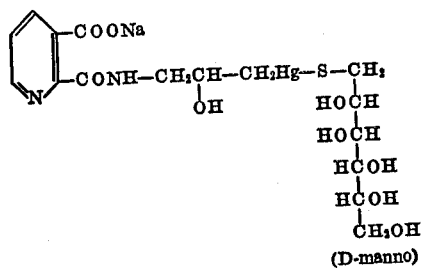

(D-manno)

Example 5

4.5 parts by weight of N-[N-(2-methoxy-3-hydroxymercuripropyl)-carbamyl-succinamic acid, prepared according to Geiger, U. S. Patent No. 2,208,941, are dissolved in 10 parts by volume of 1-normal sodium hydroxide solution, an equimolecular amount of 1-thiosorbitol is added, and the solution filtered. The reaction product is precipitated from the filtrate by adding 150 parts by volume of acetone and after being isolated, is washed repeatedly with fresh acetone, after which it is dried in vacuo. The product, the N-[N-(2-methoxy-3-{D-gluco-pentahydroxyhexyl-mercaptomercuri}-propyl)-carbamyl]-succinamic acid sodium salt, is readily soluble in water; it melts at 90–95° and corresponds to the formula

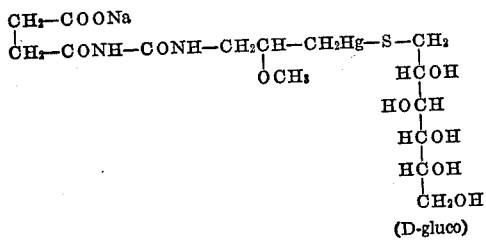

(D-gluco)

Example 6

5.3 parts by weight of N-(2-methoxy-3-acetoxy-mercuripropyl)-camphoramic acid, prepared according to U. S. Patent No. 2,117,901, are dissolved in 10 parts by volume of 2-normal sodium hydroxide solution, an equimolecular quantity of thiosorbitol in 5 parts by volume of water is added and the solution filtered. The reaction product is precipitated by adding 100 parts by volume of acetone to the filtrate, whereupon the precipitate is separated, washed repeatedly with fresh acetone, and dried in vacuo. The product, the N-[2-methoxy-3-(D-gluco-pentahydroxyhexyl-mercaptomercuri)-propyl]-camphoramic acid sodium sodium salt, is somewhat hygroscopic and very soluble in water; it melts at 100–130° (with decomposition) and corresponds to the formula

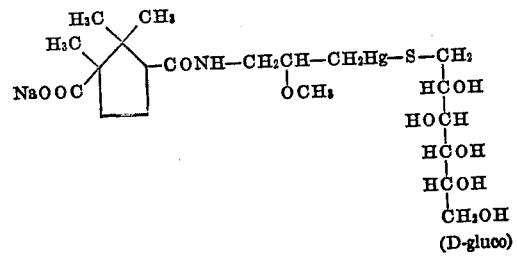

(D-gluco)

Example 7

2.2 parts by weight of o-[N-(2-methoxy-3-hydroxymercuripropyl)-carbamyl-phenoxyacetic acid (B. I. O. S. report 766, page 122) are dissolved in 2.3 parts by volume of 2-normal sodium hydroxide solution and then an equimolecular quantity of 1-thiosorbitol in 1 part by volume of water is added. The solution is filtered and the reaction product precipitated from the filtrate by adding 100 parts by volume of acetone. The precipitate is isolated, washed repeatedly with fresh acetone and then dried in vacuo. The product, the 1-[N-(2-methoxy-3-{D-gluco-pentahydroxyhexyl - mercaptomercuri} - propyl) - carbamyl - phenoxyacetic acid sodium salt is readily soluble in water; it melts at 58° (with decomposition) and corresponds to the formula

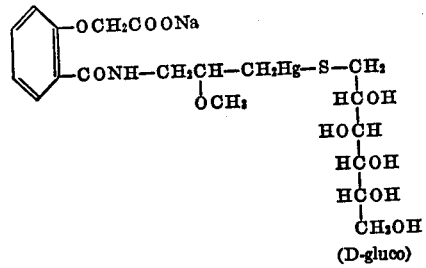

(D-gluco)

Example 8

4.4 parts by weight of 2-[N-(2-hydroxy-3-hydroxymercuripropyl)-carbamyl]-nicotinic acid are dissolved in 10 parts by volume of 1-normal sodium hydroxide solution. A solution of an equimolecular amount of 1-thiosorbitol in 15 parts by volume of water is added, the solution filtered, frozen and dried from the frozen state in vacuo. The 2-[N-2-hydroxy-3-{D-gluco-pentahydroxyhexyl-mercaptomercuri}-propyl)-carbamyl]-nicotinic acid sodium salt is obtained as a friable sponge-like solid.

Example 9

9.4 parts by weight of quinolinic acid allyl imide prepared by reacting quinolinic acid anhydride with allylamine, are dissolved in 125 parts by volume of methanol and added to a solution of 17.5 parts by weight of mercuric acetate dissolved in 330 parts by volume of methanol. The mixture is refluxed for 16 hours and then evaporated to dryness in vacuo. The residue is dissolved in 60 parts by volume of 1-normal sodium hydroxide solution, treated with activated carbon and filtered. On standing, the hydroxymercuri-compound crystallizes. It is filtered off, washed with water, and dried in vacuo. The product is 2-[N-(2-methoxy-3-hydroxymercuripropyl)-carbamyl]-nicotinic acid; it has a melting point of 185–190° (with decomposition).

9.1 parts by weight of the last-named mercurated product are dissolved in 10 parts by volume of 2-normal sodium hydroxide solution. The solution is filtered, an equimolecular quantity of 1-thiosorbitol dissolved in 10 parts by volume of water, is added to the filtrate, and the resultant mixture again filtered. The reaction product is precipitated from the filtrate by adding 200 parts by volume of acetone. The precipitate is separated, washed repeatedly with fresh acetone and dried in vacuo. The obtained product, the 2-[N-(2-methoxy-3-{D-glucopentahydroxy-hexyl-mercaptomercuri}-propyl)-carbamyl]-nicotinic acid sodium salt melts at 66–75°. It corresponds to the formula

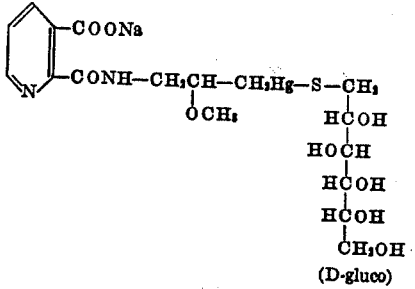

Example 10

4.41 parts by weight of 2-[N-(2-hydroxy-3-hydroxymercuripropyl)-carbamyl]-nicotinic acid are suspended in 10 parts by volume of 1-normal potassium hydroxide solution. On addition of an equimolecular amount of 1-thiosorbitol, a clear solution is obtained. This solution is treated with activated carbon and filtered. The product is precipitated by diluting the filtrate with 100 parts by volume of methanol. The separated precipitate is washed repeatedly with dry methanol until a powdery product is obtained which is dried in vacuo. The product, the 2-[N-(2-hydroxy-3-{D-gluco-penta-hydroxyhexyl-mercaptomercuri}-propyl)-carbamyl]-nicotinic acid potassium salt, melts at 68–70°. It corresponds to the formula

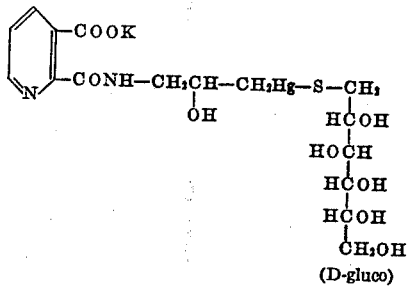

Example 11

4.41 parts by weight of 2-[N-(2-hydroxy-3-hydroxymercuripropyl)-carbamyl]-nicotinic acid are suspended in 10 parts by volume of water to which 0.37 part by weight of calcium hydroxide is added. The calcium salt forms as a thick gum which on addition of an equivalent amount of 1-thiosorbitol slowly dissolves. The pH is adjusted to 7 by adding a small quantity of calcium hydroxide and the solution filtered. The calcium salt is precipitated by adding 100 parts by volume of acetone. After standing the product solidifies, it is broken up and washed repeatedly with dry acetone and then dried in vacuo. The product, the 2-[N-(2-hydroxy-3-{D-glucopentahydroxyhexyl-mercaptomercuri}-propyl)-carbamyl]-nicotinic acid calcium salt, decomposes at 150–160° and has the following formula:

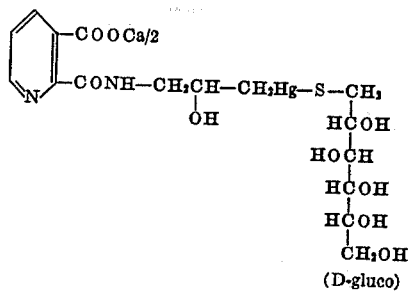

Example 12

4.41 parts by weight of 2-[N-(2-hydroxy-3-hydroxymercuripropyl)-carbamyl]-nicotinic acid are suspended in 10 parts by volume of water. An equivalent amount of 1-thiosorbitol is dissolved in 10 parts by volume of water and added to the suspension. A clear solution results which is filtered, frozen and dried in vacuo from the frozen state. The product, the 2-[N-(2-hydroxy-3-{D-gluco-pentahydroxyhexyl-mercaptomercuri}-propyl)-carbamyl]-nicotinic acid, is obtained as a friable mass which decomposes between 65 and 90° and has the following formula

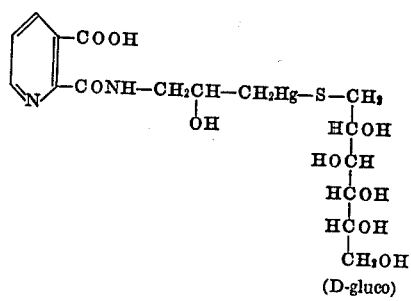

Having thus disclosed the invention what is claimed is:

1. An organic mercury compound which corresponds to the formula $$MOOC-R-CONH-CH_2CH-CH_2Hg-S-CH_2(CHOH)_nCH_2OH$$
$$|$$
$$OR^1$$

wherein —OC—R—CO— represents the divalent diacyl radical derived from a dicarboxylic acid selected from the group consisting of camphoric acid, N-carboxy succinamic acid, phthalic acid, 2-carboxy-phenoxyacetic acid and quinolinic acid, R¹ stands for a member selected from the group consisting of hydrogen and lower alkyl, M is a member selected from the group consisting of hydrogen, alkali metals and alkaline earth metals, and n is one of the integers 1, 2, 3, 4 and 5.

2. The organic mercurial which corresponds to the formula

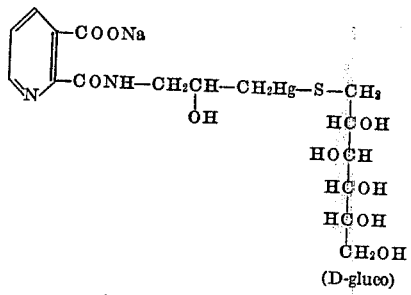

3. The organic mercurial which corresponds to the formula

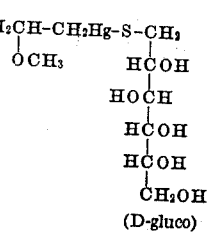

4. The organic mercurial which corresponds to the formula

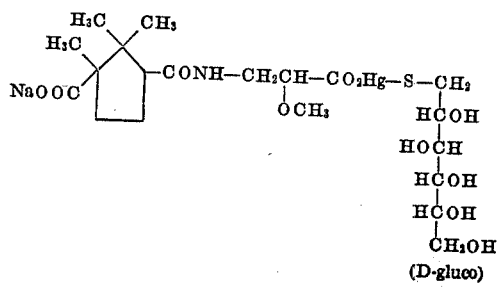

5. The organic mercurial which corresponds to the formula
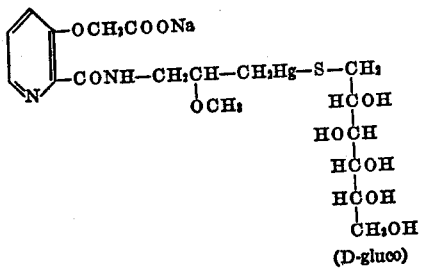
6. The organic mercurial which corresponds to the formula
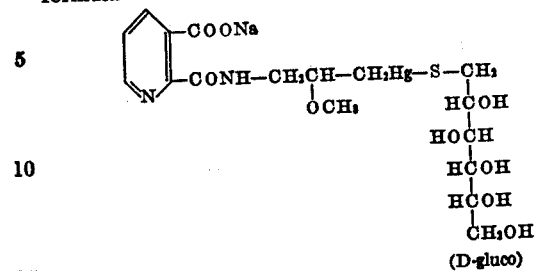
References Cited in the file of this patent
UNITED STATES PATENTS
2,557,772   Shelton et al. _____ June 19, 1951
FOREIGN PATENTS
619,515   Great Britain _____ Mar. 10, 1949